(12) United States Patent     (10) Patent No.:   US 12,681,958 B2

Reynolds et al.     (45) Date of Patent:    Jul. 14, 2026

---

(54) SYSTEMS AND METHODS FOR GENERATING RELATIONAL SEMANTIC STRUCTURES

(71) Applicant: Capital One Services, LLC, McLean, VA (US)

(72) Inventors: Anthony P. Reynolds, McLean, VA (US); David Sachitano, Union City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/825,968

(22) Filed: Sep. 5, 2024

(65) Prior Publication Data

US 2026/0064721 A1     Mar. 5, 2026

(51) Int. Cl.
*G06F 16/28*     (2019.01)

(52) U.S. Cl.
CPC ................................. *G06F 16/285* (2019.01)

(58) Field of Classification Search
CPC ...................................................... G06F 16/285
USPC ........................................................ 707/803
See application file for complete search history.

(56) References Cited

U.S. PATENT DOCUMENTS

| | | | |
|---|---|---|---|
| 11,501,042 B2 * | 11/2022 | Steingrimsson ... | G06Q 30/0202 |
| 2022/0156300 A1 * | 5/2022 | Paruchuri ............ | G06V 30/416 |
| 2023/0112250 A1 * | 4/2023 | Agrawal ............... | G06F 16/221 |
| | | | 707/714 |
| 2024/0086793 A1 * | 3/2024 | Brown ................ | G06F 16/9535 |

* cited by examiner

*Primary Examiner* — Hung T Vy

(74) *Attorney, Agent, or Firm* — Foley & Lardner LLP

(57)      ABSTRACT

Systems and methods for generating relational semantic structures. In some aspects, the system retrieves a training dataset for the generation of a first semantic standardization model, comprising a set of concepts and a set of descriptors. The system trains a preliminary model based on the training dataset to correlate the set of descriptors with a set of embeddings. Based on the set of embeddings, the system trains the first semantic standardization model to find patterns and relations between embeddings. Using the first semantic standardization model, the system generates a relational semantic structure comprising a relation from each concept in the set of concepts to one or more descriptors in the set of descriptors. Based on the relational semantic structure, the system generates one or more notifications to update and standardize descriptors used to describe concepts in the set of concepts.

20 Claims, 4 Drawing Sheets

<u>400</u>

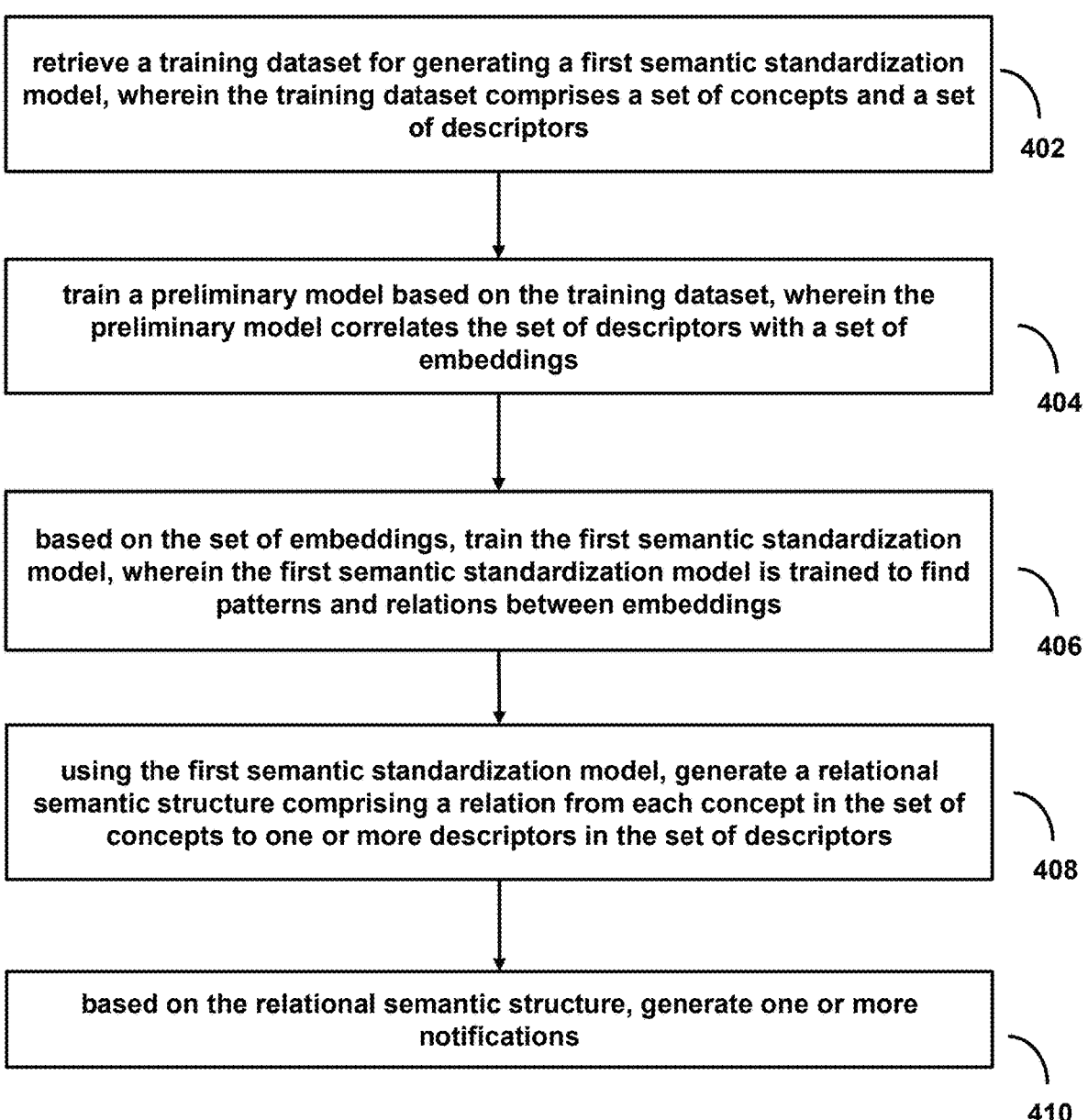

retrieve a training dataset for generating a first semantic standardization model, wherein the training dataset comprises a set of concepts and a set of descriptors

402 train a preliminary model based on the training dataset, wherein the preliminary model correlates the set of descriptors with a set of embeddings

404 based on the set of embeddings, train the first semantic standardization model, wherein the first semantic standardization model is trained to find patterns and relations between embeddings

406 using the first semantic standardization model, generate a relational semantic structure comprising a relation from each concept in the set of concepts to one or more descriptors in the set of descriptors

408 based on the relational semantic structure, generate one or more notifications

SYSTEMS AND METHODS FOR GENERATING RELATIONAL SEMANTIC STRUCTURES

SUMMARY

Methods and systems are described herein for novel uses and/or improvements to artificial intelligence applications. As one example, methods and systems are described herein for generating relational semantic structures using a semantic standardization model. For example, the system may use a preliminary model to generate embeddings based on textual descriptors and use the semantic standardization model to find patterns and relations in the embeddings to identify textual descriptors corresponding to the same concept.

Systems and methods are described herein for a novel approach to generating relational semantic structures, such as ontologies and knowledge maps. Machine learning technology such as language processing models and embedding models are uniquely well positioned to find patterns and relations in text data with different terminology that often obfuscate common meaning between similar terms due to the volume of the text data. For example, over a large body of text, the same concept may be described by a set of different descriptors in each section of the text, due to different authors, time periods, audiences, etc. The systems and methods described herein relate to generating an ontology using a machine learning architecture that leverages embedding vectors to perform sequence detection in order to accurately and efficiently identify relationships in a corpus of text. The advantages over traditional methods of generating ontologies and knowledge maps include improved accuracy and reliability using novel machine learning techniques described herein.

In some aspects, methods and systems are described herein comprising retrieving a training dataset for generating a first semantic standardization model, wherein the training dataset comprises a set of concepts and a set of descriptors; training a preliminary model based on the training dataset, wherein the preliminary model correlates the set of descriptors with a set of embeddings; based on the set of embeddings, training the first semantic standardization model, wherein the first semantic standardization model is trained to find patterns and relations between embeddings; using the first semantic standardization model, generating a relational semantic structure comprising a relation from each concept in the set of concepts to one or more descriptors in the set of descriptors; and based on the relational semantic structure, generating one or more notifications.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in generating relational semantic structures using a semantic standardization model, in accordance with one or more embodiments.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
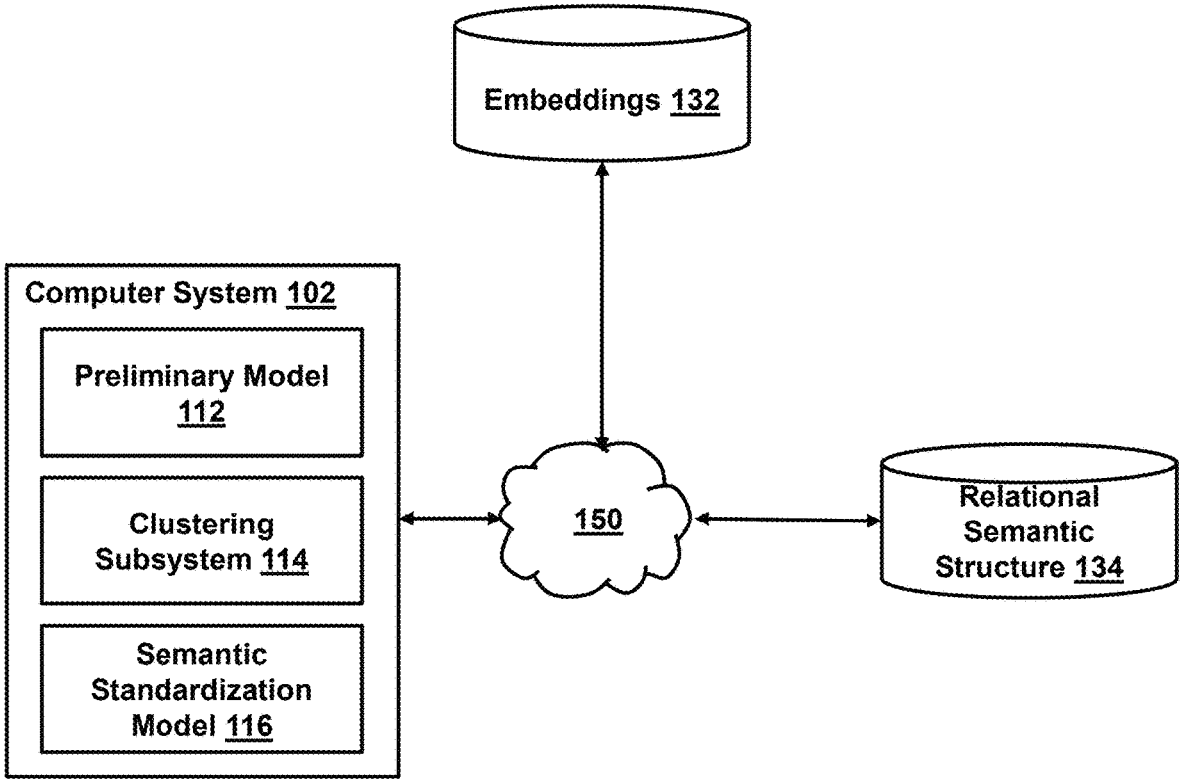
FIG. 1 shows an illustrative diagram for a system for generating relational semantic structures using a semantic standardization model, in accordance with one or more embodiments.

FIG. 1 shows an illustrative diagram for system 150, which contains hardware and software components used to provide responses to search queries based on adjacent keywords and filters generated using a machine learning model, in accordance with one or more embodiments. For example, Computer System 102, a part of system 150, may include Preliminary Model 112, Clustering Subsystem 114, and Semantic Standardization Model 116. System 150 may create, store, or otherwise interact with Embeddings 132 and Relational Semantic Structure 134.

The system may retrieve or collect a training dataset for the generation of a first semantic standardization model (e.g., Semantic Standardization Model 116). The training dataset may comprise a set of concepts and a set of descriptors. For example, the training dataset may correspond to a body of text. The body of text may contain the set of descriptors in discussions of one or more subjects. The body of text may be written by different authors over time and may consist of articles, technical documentations, instruction sets, and other communications. Thus, the descriptors may be heterogenous in meaning and more than one descriptor may be used to serve the same purpose. Descriptors can map onto concepts either explicitly mentioned in the body of text or indirectly referred to. More than one descriptor may describe the same concept. The system may tokenize the body of text by transforming it into a text token format. Each word, sentence, paragraph or other semantic element may be represented as a text token, which may be translated to a real-valued embedding. These tokens can be words, sentences, or even individual characters, depending on the level of granularity required. The system may identify sentence boundaries, such as periods, question marks, or exclamation marks to select sentence-level tokens.

Each sentence is further divided into individual words. This step involves removing punctuation marks, splitting words based on spaces, and handling contractions or hyphenated words. The system may convert all words to lowercase to ensure consistency and avoid duplication of words due to case differences. Depending on the requirements, special characters like numbers, symbols, or emojis may be treated as separate tokens or removed altogether. Stop words (e.g., "the," "is," "and") that do not carry significant meaning are often removed to reduce noise and improve the efficiency of subsequent text analysis tasks. The system may additionally reduce words to their base or root form (e.g., "running" to "run"), while lemmatization aims to convert words to their dictionary form (e.g., "better" to "good"). These techniques help to consolidate similar words and reduce vocabulary size. A training dataset based on high-quality text tokens is instrumental in reducing bloat in the set of descriptors for easier, faster, and more accurate consolidation onto concepts.

The system may train a preliminary model (e.g., Preliminary Model 112) based on the training dataset, wherein the preliminary model correlates the set of descriptors with a set of embeddings (e.g., Embeddings 132). For example, Preliminary Model 112 may be an embedding model using a deep neural network algorithm trained to produce vector representations of input text tokens. The system may train Preliminary Model 112 in an unsupervised fashion to embed text tokens into real-valued vectors utilizing advanced techniques such as word2vec or GloVe. These algorithms aim to capture the semantic and syntactic relationships between words by learning distributed representations, also known as word embeddings. The system may provide the training dataset for Preliminary Model 112 to predict embeddings as a part of the training and evaluation process. The model then iterates over the text, considering the context in which each word appears. It learns to predict the probability of a word occurring given its neighboring words (skip-gram model) or predicts the surrounding words given a target word (continuous bag-of-words model). This prediction task forces the model to learn meaningful representations of words based on their contextual usage.

During training, the model adjusts its internal parameters to minimize the difference between predicted and actual word occurrences. This optimization process is typically performed using stochastic gradient descent or other optimization algorithms. The system may use a loss function to enforce the integrity of predictions by the preliminary model. As the model iterates over the text, it gradually learns to encode words into dense, low-dimensional vectors, where similar words are represented by vectors that are closer together in the vector space.

The resulting word embeddings capture various linguistic properties, such as semantic similarity and syntactic regularities. For example, words with similar meanings or that often appear in similar contexts will have similar vector representations. Additionally, vector arithmetic operations can be performed on the embeddings, allowing for intriguing analogies like "king−man+woman=queen."

Once the preliminary model is trained, the embedded vectors can be used as features in downstream tasks such as text classification, information retrieval, or sentiment analysis. These real-valued representations enable the model to leverage the semantic relationships between words, improving the performance of subsequent machine learning algorithms.

The system trains the first semantic standardization model (e.g., Semantic Standardization Model 116) based on the set of embeddings. The first semantic standardization model may be trained to find patterns and relations between embeddings such as those in Embeddings 132. For example, the first semantic standardization model is a language processing model trained to perform pattern mining and sequence mining based on a set of embeddings. The training process leverages a supervised or semi-supervised approach where the model learns to recognize and predict patterns and sequences within these embeddings. This is achieved by employing techniques such as recurrent neural networks (RNNs) or transformers, which are adept at handling sequential data and capturing dependencies over long ranges. During training, the model optimizes a loss function designed to measure its performance in identifying correct patterns and sequences, using backpropagation and gradient descent to update its weights. The output layer of the model is structured to produce a relational representation, which involves generating tuples that indicate correspondences and relations between the embeddings. The training process includes fine-tuning on a validation set to ensure generalization and robustness of the model. Additionally, techniques like attention mechanisms are employed to focus on relevant parts of the input embeddings, enhancing the model's ability to discern intricate patterns and sequences.

The system then generates a relational semantic structure (e.g., Relational Semantic Structure 134), including a relation from each concept in the set of concepts to one or more descriptors in the set of descriptors, using Semantic Standardization Model 116. For example, Relational Semantic Structure 134 is a relational data structure comprising a set of vertices and connections, where each vertex in the relational semantic structure corresponds to a descriptor in the set of descriptors, and each connection in Relational Semantic Structure 134 corresponds to a pattern of proximity between a first descriptor in the set of descriptors and a second descriptor in the set of descriptors. The system may generate the relational semantic structure based on the output of Semantic Standardization Model 116. However, the system may make additional modifications to further fine-tune the relational semantic structure.

For example, the system (e.g., using Clustering Subsystem 114) may determine a set of pairwise distances from embeddings for each descriptor to each other descriptor in the set of descriptors. Each distance is based on a mathematical comparison of a first embedding to a second embedding. The distances in the set of pairwise distances may be indicative of the estimated similarities between a first embedding and a second embedding. For example, the system may calculate a Euclidean distance between each embedding to each other embedding in Embeddings 132. Based on the set of pairwise distances, the system may determine a distance threshold, for example, a percentile of the set of pairwise distances. The distance threshold may indicate sufficient similarity for the system to group descriptors as corresponding to the same concept. Based on the distance threshold and the set of pairwise distances, the system selects a set of clusters from the set of embeddings. Each cluster in the set of clusters comprises embeddings with a mutual distance less than the distance threshold. The system may thus identify clusters of descriptors that can be combined into a single vertex in the relational semantic structure. The system generates the relational semantic structure to include the set of clusters. Doing so reduces the number of redundant vertices and makes for a more accurate and powerful relational semantic structure for the task of aggregating descriptors of common meaning.

In some embodiments, the system (e.g., Clustering Subsystem 114) may generate the relational semantic structure using a set of prototype concepts based on a distance-based clustering algorithm applied to the set of embeddings. The set of prototype concepts comprises real-value vectors generated from weighted averages of embeddings from the set of embeddings. In one example, the system may identify clusters of embeddings in Embeddings 132 using a method as described above. Within each cluster, the system may identify a prototype embedding by calculating the mathematical center of the embeddings in the cluster. The system may correlate one or more descriptors in the set of descriptors to the set of prototype concepts.

The system may generate one or more notifications based on the relational semantic structure. The system may apply a validation program to the relational semantic structure, wherein the validation program comprises a set of validation tests regarding the set of descriptors. The system may update the semantic standardization model based on the relational semantic structure failing one or more of the set of validation tests.

The system may use the relational semantic structure to recommend one or more changes to a body of text. The body of text may include the training dataset but may also include unseen text data during training. The changes may reflect the common meaning underlying descriptors as identified by the relational semantic structure. Doing so would allow for easier communication across project teams, business units, and may update old terminology to be standardized. For example, the relational semantic structure can be used to rewrite product specifications or technical documentations to better reflect evolving needs of engineering teams.

Figure 2:
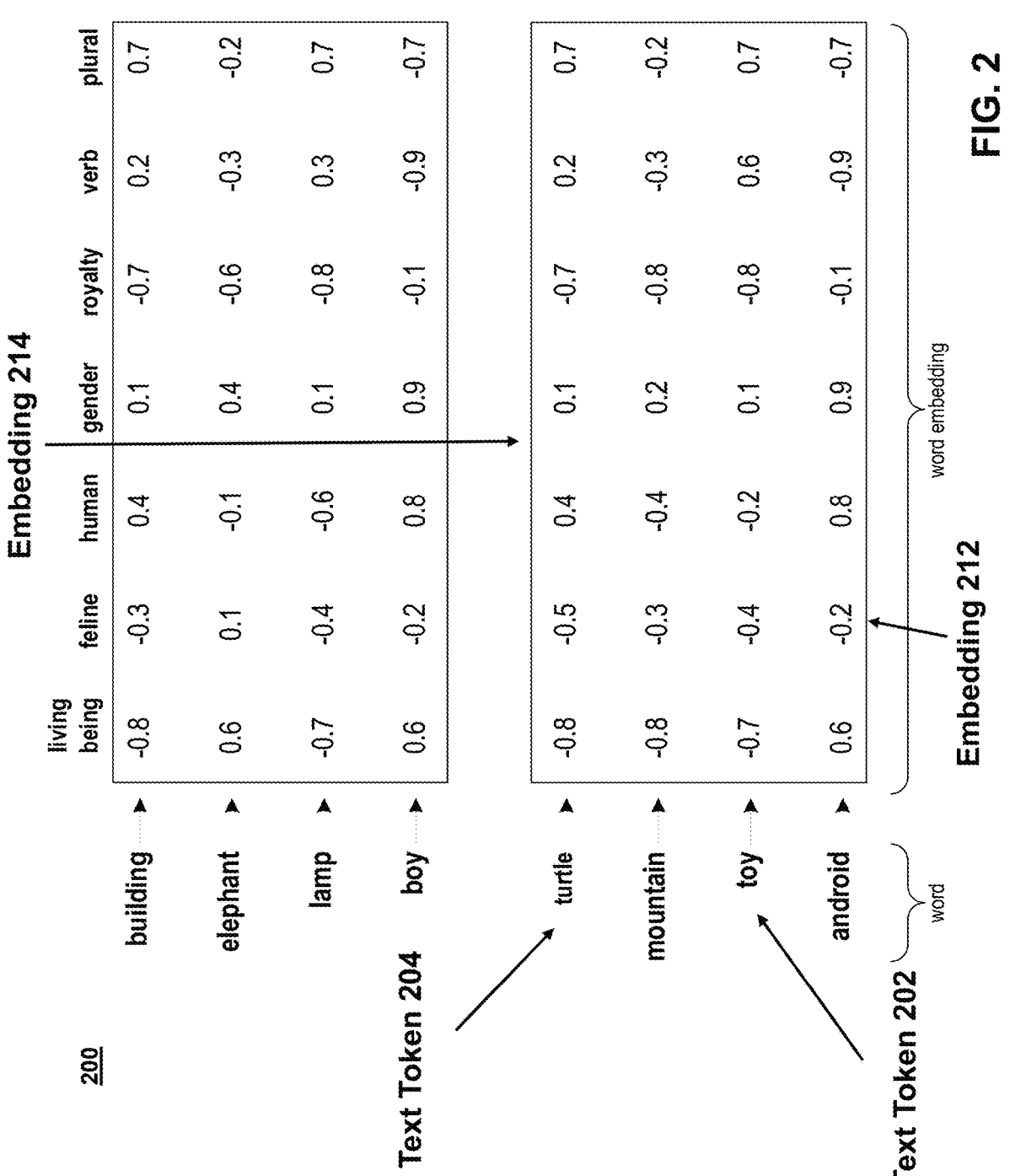
FIG. 2 shows text tokens being transformed into real-valued embedding vectors, in accordance with one or more embodiments.

FIG. 2 shows illustration 200 for text tokens being projected to embeddings in a real-valued space. These text tokens may constitute descriptions of user behavior from which motifs and sequence patterns can be extracted. For example, Text Token 202 comprises the word "toy" and Text Token 204 comprises the word "turtle". In some embodiments, some text tokens may include sentences or paragraphs instead of words. Alternatively, numbers, symbols, or punctuation may also be text tokens. Each text token may correspond to an embedding. For example, Text Token 202 corresponds to Embedding 212, a vector of real values: [−0.7, −0.4, −0.6, 0.1, −0.8, 0.3, 0.7]. The vector of real values is associated with a set of features, each of which correlates with an attribute that may be associated with a word. Text Token 204 may be associated with Embedding 214, which is a vector of different real numbers associated with the same set of features: [−0.8, −0.3, 0.4, 0.1, −0.7, 0.2, 0.7]. For example, some features may correlate with whether a word signifies a human, what gender the word would be, or whether the word is a verb. In some embodiments, sentences, paragraphs, and symbols may be associated with a set of features different from the set used for words.

Embeddings in the format of Embedding 212 and Embedding 214 may be processed by a model such as Semantic Standardization Model 116. Semantic Standardization Model 116 may, for example, take an input set of embeddings and use a combination of weights, biases and activations in a deep neural network to generate an output. The output may, for example, be in the format of a relational data structure including vertices that comprise clusters of embeddings. The relational data structure may expose similarities, connections, and correspondences between embeddings input to Semantic Standardization Model 116.

Figure 3:
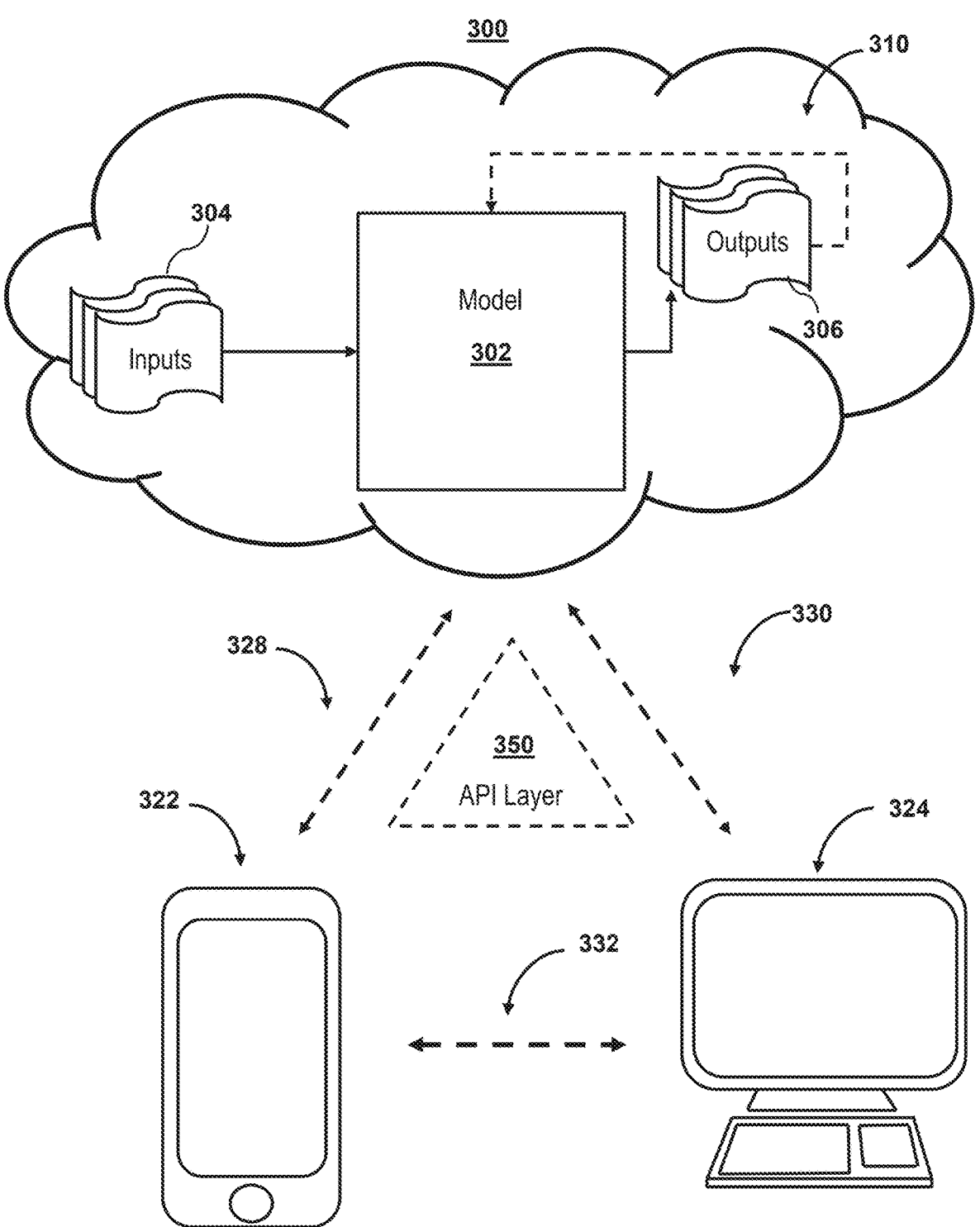
FIG. 3 shows illustrative components for generating relational semantic structures using a semantic standardization model, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., training Preliminary Model 112 to output embeddings corresponding to text tokens).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output. (e.g., training Preliminary Model 112 to produce accurate embeddings).

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

FIG. 4 shows a flowchart of the steps involved in providing search query responses using adjacent keywords and search filters, in accordance with one or more embodiments. For example, the system may use process 400 (e.g., as implemented on one or more system components described above) in order to generate adjacent keywords based on embeddings of search queries, compute similarity and popularity metrics for each adjacent keyword, generate filters based on adjacent keywords, and use filters to provide responses to search queries.

At step 402, process 400 (e.g., using one or more components described above) retrieves a training dataset for the generation of a first semantic standardization model. The training dataset may comprise a set of concepts and a set of descriptors. For example, the training dataset may correspond to a body of text. The body of text may contain the set of descriptors in discussions of one or more subjects. The body of text may be written by different authors over time and may consist of articles, technical documentations, instruction sets, and other communications. Thus, the descriptors may be heterogenous in meaning, and more than one descriptor may be used to serve the same purpose. Descriptors can map onto concepts either explicitly mentioned in the body of text or indirectly referred to. More than one descriptor may describe the same concept. The system may tokenize the body of text by transforming it into a text token format. Each word, sentence, paragraph, or other semantic element may be represented as a text token, which may be translated to a real-valued embedding. These tokens can be words, sentences, or even individual characters, depending on the level of granularity required. The system may identify sentence boundaries, such as periods, question marks, or exclamation marks to select sentence-level tokens.

Each sentence is further divided into individual words. This step involves removing punctuation marks, splitting words based on spaces, and handling contractions or hyphenated words. The system may convert all words to lowercase to ensure consistency and avoid duplication of words due to case differences. Depending on the requirements, special characters like numbers, symbols, or emojis may be treated as separate tokens or removed altogether. Stop words (e.g., "the," "is," "and") that do not carry significant meaning are often removed to reduce noise and improve the efficiency of subsequent text analysis tasks. The system may additionally reduce words to their base or root form (e.g., "running" to "run"), while lemmatization aims to convert words to their dictionary form (e.g., "better" to "good"). These techniques help to consolidate similar words and reduce vocabulary size. A training dataset based on high-quality text tokens is instrumental in reducing bloat in the set of descriptors for easier, faster, and more accurate consolidation onto concepts.

At step 404, process 400 (e.g., using one or more components described above) trains a preliminary model based on the training dataset, wherein the preliminary model correlates the set of descriptors with a set of embeddings. For example, the preliminary model is an embedding model using a deep neural network algorithm trained to produce vector representations of input text tokens. The system may train the preliminary model in an unsupervised fashion to embed text tokens into real-valued vectors utilizing advanced techniques such as word2vec or GloVe. These algorithms aim to capture the semantic and syntactic relationships between words by learning distributed representations, also known as word embeddings. The system may provide the training dataset for the preliminary model to predict embeddings as a part of the training and evaluation process. The model then iterates over the text, considering the context in which each word appears. It learns to predict the probability of a word occurring given its neighboring words (skip-gram model) or predicts the surrounding words given a target word (continuous bag-of-words model). This prediction task forces the model to learn meaningful representations of words based on their contextual usage.

During training, the model adjusts its internal parameters to minimize the difference between predicted and actual word occurrences. This optimization process is typically performed using stochastic gradient descent or other optimization algorithms. The system may use a loss function to enforce the integrity of predictions by the preliminary model. As the model iterates over the text, it gradually learns to encode words into dense, low-dimensional vectors, where similar words are represented by vectors that are closer together in the vector space.

The resulting word embeddings capture various linguistic properties, such as semantic similarity and syntactic regularities. For example, words with similar meanings or that often appear in similar contexts will have similar vector representations. Additionally, vector arithmetic operations can be performed on the embeddings, allowing for intriguing analogies like "king–man+woman=queen."

Once the preliminary model is trained, the embedded vectors can be used as features in downstream tasks such as text classification, information retrieval, or sentiment analysis. These real-valued representations enable the model to leverage the semantic relationships between words, improving the performance of subsequent machine learning algorithms.

At step 406, process 400 (e.g., using one or more components described above) trains the first semantic standardization model based on the set of embeddings. The first semantic standardization model may be trained to find patterns and relations between embeddings. For example, the first semantic standardization model is a language processing model trained to perform pattern mining and sequence mining based on a set of embeddings. The training process leverages a supervised or semi-supervised approach where the model learns to recognize and predict patterns and sequences within these embeddings. This is achieved by employing techniques such as RNNs or transformers, which are adept at handling sequential data and capturing dependencies over long ranges. During training, the model optimizes a loss function designed to measure its performance in identifying correct patterns and sequences, using backpropagation and gradient descent to update its weights. The output layer of the model is structured to produce a relational representation, which involves generating tuples that indicate correspondences and relations between the embeddings. The training process includes fine-tuning on a validation set to ensure generalization and robustness of the model. Additionally, techniques like attention mechanisms are employed to focus on relevant parts of the input embeddings, enhancing the model's ability to discern intricate patterns and sequences.

At step 408, process 400 (e.g., using one or more components described above) generates a relational semantic structure comprising a relation from each concept in the set of concepts to one or more descriptors in the set of descriptors using the first semantic standardization model. For example, the relational semantic structure is a relational data structure comprising a set of vertices and connections, where each vertex in the relational semantic structure corresponds to a descriptor in the set of descriptors, and each connection in the relational semantic structure corresponds to a pattern of proximity between a first descriptor in the set of descriptors and a second descriptor in the set of descriptors. The system may generate the relational semantic structure based on the output of Semantic Standardization Model 116. However, the system may make additional modifications to further fine-tune the relational semantic structure.

For example, the system may determine a set of pairwise distances from embeddings for each descriptor to each other descriptor in the set of descriptors. Each distance is based on a mathematical comparison of a first embedding to a second embedding. The distances in the set of pairwise distances may be indicative of the estimated similarities between a first embedding and a second embedding. For example, the system may calculate a Euclidean distance between each embedding to each other embedding in Embeddings 132. Based on the set of pairwise distances, the system may determine a distance threshold, for example, a percentile of the set of pairwise distances. The distance threshold may indicate the sufficient similarity for the system to group descriptors as corresponding to the same concept. Based on the distance threshold and the set of pairwise distances, the system selects a set of clusters from the set of embeddings. Each cluster in the set of clusters comprises embeddings with a mutual distance less than the distance threshold. The system may thus identify clusters of descriptors that can be combined into a single vertex in the relational semantic structure. The system generates the relational semantic structure to include the set of clusters. Doing so reduces the number of redundant vertices and makes for a more accurate and powerful relational semantic structure for the task of aggregating descriptors of common meaning.

In some embodiments, the system may generate the relational semantic structure a set of prototype concepts generated based on a distance-based clustering algorithm applied to the set of embeddings. The set of prototype concepts comprises real-value vectors generated from weighted averages of embeddings from the set of embeddings. In one example, the system may identify clusters of embeddings in Embeddings 132 using a method as described above. Within each cluster, the system may identify a prototype embedding by calculating a mathematical center of the embeddings in the cluster. The system may correlate one or more descriptors in the set of descriptors to the set of prototype concepts.

At step 410, process 400 (e.g., using one or more components described above) generates one or more notifications based on the relational semantic structure. The system may apply a validation program to the relational semantic structure, wherein the validation program comprises a set of validation tests regarding the set of descriptors. The system may update the semantic standardization model based on the relational semantic structure failing one or more of the set of validation tests.

The system may use the relational semantic structure to recommend one or more changes to a body of text. The body of text may include the training dataset, but may also include unseen text data during training. The changes may reflect the common meaning underlying descriptors as identified by the relational semantic structure. Doing so would allow for easier communication across project teams, business units, and may update old terminology to be standardized. For example, the relational semantic structure can be used to rewrite product specifications or technical documentations to better reflect evolving needs of engineering teams.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: retrieving a training dataset for generating a first semantic standardization model, wherein the training dataset comprises natural-language text representing a set of concepts using a set of descriptors, and wherein each concept in the set of concepts corresponds to one or more descriptors of the set of descriptors; training a preliminary model based on the training dataset, wherein the preliminary model correlates each descriptor in the set of descriptors with an embedding from a set of embeddings, and wherein the set of embeddings comprises vectors of real values representing textual meaning corresponding to descriptors in the set of descriptors; based on the set of embeddings, training the first semantic standardization model, wherein the first semantic standardization model is trained to find patterns and relations between embeddings within the set of embeddings; generating, using the first semantic standardization model, a relational semantic structure comprising a relation from each concept in the set of concepts to one or more descriptors in the set of descriptors; and based on the relational semantic structure, generating one or more notifications comprising replacing one or more terms in a body of text with descriptors in the relational semantic structure.

2. A method for generating a relational semantic structure, the system comprising: retrieving a training dataset for the generation of a first semantic standardization model, wherein the training set comprises a set of concepts and a set of descriptors; training a preliminary model based on the training dataset, wherein the preliminary model correlates the set of descriptors with a set of embeddings; based on the set of embeddings, training the first semantic standardization model, wherein the first semantic standardization model is trained to find patterns and relations between embeddings; using the first semantic standardization model, generating a relational semantic structure comprising a relation from each concept in the set of concepts to one or more descriptors in the set of descriptors; and based on the relational semantic structure, generating one or more notifications.

3. A method comprising: retrieving a training dataset for the generation of a first semantic standardization model, wherein the training set comprises a set of concepts and a set of descriptors; receiving a preliminary model based on the training dataset, wherein the preliminary model is trained to correlate the set of descriptors with a set of embeddings; based on the set of embeddings, training the first semantic standardization model, wherein the first semantic standardization model is trained to find patterns and relations between embeddings; using the first semantic standardization model, generating a relational semantic structure comprising a relation from each concept in the set of concepts to one or more descriptors in the set of descriptors; and based on the relational semantic structure, generating one or more notifications.

4. The method of any one of the preceding embodiments, wherein using the first semantic standardization model to generate the relational semantic structure comprises: determining a set of pairwise distances from embeddings for each descriptor to each other descriptor in the set of descriptors, wherein each distance in the set of pairwise distances is based on a mathematical comparison of a first embedding to a second embedding; and based on the set of pairwise distances, determining a distance threshold.

5. The method of any one of the preceding embodiments, further comprising: based on the distance threshold and the set of pairwise distances, selecting a set of clusters from the set of embeddings, wherein each cluster in the set of clusters comprises embeddings with a mutual distance less than the distance threshold; and generating the relational semantic structure to include the set of clusters.

6. The method of any one of the preceding embodiments, wherein the relational semantic structure is a relational data structure comprising a set of vertices and connections, wherein each vertice in the relational semantic structure corresponds to a descriptor in the set of descriptors, and each connection in the relational semantic structure corresponds to a pattern of proximity between a first descriptor in the set of descriptors and a second descriptor in the set of descriptors.

7. The method of any one of the preceding embodiments, further comprising a set of prototype concepts generated based on a distance-based clustering algorithm applied to the set of embeddings, wherein the set of prototype concepts comprises real-value vectors generated from weighted averages of embeddings from the set of embeddings.

8. The method of any one of the preceding embodiments, further comprising correlating one or more descriptors in the set of descriptors to the set of prototype concepts.

9. The method of any one of the preceding embodiments, further comprising applying a validation program to the relational semantic structure, wherein the validation program comprises a set of validation tests regarding the set of descriptors.

10. The method of any one of the preceding embodiments, further comprising updating the semantic standardization model based on the relational semantic structure failing one or more of the set of validation tests.

11. The method of any one of the preceding embodiments, wherein the first semantic standardization model is a language processing model trained to perform feature extraction based on a bidirectional representation encoder algorithm.

12. The method of any one of the preceding embodiments, wherein the preliminary model is an embedding model using a deep neural network algorithm trained to produce vector representations of input text tokens.

13. One or more non-transitory, computer-readable media storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for generating a relational semantic structure based on a semantic standardization model, the system comprising:

one or more processors; and one or more non-transitory, computer-readable media comprising instructions that, when executed by the one or more processors, cause operations comprising:

retrieving a training dataset for generating a first semantic standardization model, wherein the training dataset comprises natural-language text representing a set of concepts using a set of descriptors, and wherein each concept in the set of concepts corresponds to one or more descriptors of the set of descriptors;

training a preliminary model based on the training dataset, wherein the preliminary model correlates each descriptor in the set of descriptors with an embedding from a set of embeddings, and wherein the set of embeddings comprises vectors of real values representing textual meaning corresponding to descriptors in the set of descriptors;

based on the set of embeddings, training the first semantic standardization model, wherein the first semantic standardization model is trained to find patterns and relations between embeddings within the set of embeddings;

generating, using the first semantic standardization model, a relational semantic structure comprising a relation from each concept in the set of concepts to one or more descriptors in the set of descriptors; and based on the relational semantic structure, generating one or more notifications comprising a recommendation to one or more terms in a body of text with descriptors in the relational semantic structure.

2. A method for generating a relational semantic structure using one or more processors, the method comprising:

retrieving, by the one or more processors, a training dataset for generating a first semantic standardization model, wherein the training dataset comprises a set of concepts and a set of descriptors;

training, by the one or more processors, a preliminary model based on the training dataset, wherein the preliminary model correlates the set of descriptors with a set of embeddings;

based on the set of embeddings, training the first semantic standardization model, wherein the first semantic standardization model is trained to find patterns and relations between embeddings;

using, by the one or more processors, the first semantic standardization model, generating a relational semantic structure comprising a relation from each concept in the set of concepts to one or more descriptors in the set of descriptors; and based on the relational semantic structure, generating, by the one or more processors, one or more notifications.

3. The method of claim 2, wherein the preliminary model is an embedding model using a deep neural network algorithm trained to produce vector representations of input text tokens.

4. The method of claim 2, wherein using the first semantic standardization model to generate the relational semantic structure comprises:

determining a set of pairwise distances from embeddings for each descriptor to each other descriptor in the set of descriptors, wherein each distance in the set of pairwise distances is based on a mathematical comparison of a first embedding to a second embedding; and based on the set of pairwise distances, determining a distance threshold.

5. The method of claim 4, further comprising:

based on the distance threshold and the set of pairwise distances, selecting a set of clusters from the set of embeddings, wherein each cluster in the set of clusters comprises embeddings with a mutual distance less than the distance threshold; and generating the relational semantic structure to include the set of clusters.

6. The method of claim 2, wherein the relational semantic structure is a relational data structure comprising a set of vertices and connections, wherein each vertice in the relational semantic structure corresponds to a descriptor in the set of descriptors, and each connection in the relational semantic structure corresponds to a pattern of proximity between a first descriptor in the set of descriptors and a second descriptor in the set of descriptors.

7. The method of claim 2, further comprising a set of prototype concepts generated based on a distance-based clustering algorithm applied to the set of embeddings, wherein the set of prototype concepts comprise real-value vectors generated from weighted averages of embeddings from the set of embeddings.

8. The method of claim 7, further comprising correlating one or more descriptors in the set of descriptors to the set of prototype concepts.

9. The method of claim 2, further comprising applying a validation program to the relational semantic structure, wherein the validation program comprises a set of validation tests regarding the set of descriptors.

10. The method of claim 9, further comprising updating the first semantic standardization model based on the relational semantic structure failing one or more of the set of validation tests.

11. The method of claim 2, wherein the first semantic standardization model is a language processing model trained to perform feature extraction based on a bidirectional representation encoder algorithm.

12. One or more non-transitory, machine-readable media storing program instructions that, when executed by one or more processors, cause operations comprising:

using a first semantic standardization model, generating a relational semantic structure comprising a relation from each concept in a set of concepts to one or more descriptors in a set of descriptors, wherein:

the first semantic standardization model is generated using a training dataset comprising the set of concepts and the set of descriptors, a preliminary model is used to correlate the set of descriptors with a set of embeddings, the first semantic standardization model is trained based on the set of embeddings to find patterns and relations between embeddings; and based on the relational semantic structure, generating one or more notifications.

13. The one or more non-transitory, machine-readable media of claim 12, wherein the preliminary model is an embedding model using a deep neural network algorithm trained to produce vector representations of input text tokens.

14. The one or more non-transitory, machine-readable media of claim 12, wherein using the first semantic standardization model to generate the relational semantic structure comprises:

determining a set of pairwise distances from embeddings for each descriptor to each other descriptor in the set of descriptors, wherein each distance in the set of pairwise distances is based on a mathematical comparison of a first embedding to a second embedding; and based on the set of pairwise distances, determining a distance threshold.

15. The one or more non-transitory, machine-readable media of claim 14, the operations further comprising:

based on the distance threshold and the set of pairwise distances, selecting a set of clusters from the set of embeddings, wherein each cluster in the set of clusters comprises embeddings with a mutual distance less than the distance threshold; and generating the relational semantic structure to include the set of clusters.

16. The one or more non-transitory, machine-readable media of claim 12, wherein the relational semantic structure is a relational data structure comprising a set of vertices and connections, wherein each vertice in the relational semantic structure corresponds to a descriptor in the set of descriptors, and each connection in the relational semantic structure corresponds to a pattern of proximity between a first descriptor in the set of descriptors and a second descriptor in the set of descriptors.

17. The one or more non-transitory, machine-readable media of claim 12, the operations further comprising:

generating a set of prototype concepts based on a distance-based clustering algorithm applied to the set of embeddings, wherein the set of prototype concepts comprise real-value vectors generated from weighted averages of embeddings from the set of embeddings.

18. The one or more non-transitory, machine-readable media of claim 17, the operations further comprising correlating one or more descriptors in the set of descriptors to the set of prototype concepts.

19. The one or more non-transitory, machine-readable media of claim 12, the operations further comprising applying a validation program to the relational semantic structure, wherein the validation program comprises a set of validation tests regarding the set of descriptors.

20. The one or more non-transitory, machine-readable media of claim 19, the operations further comprising updating the first semantic standardization model based on the relational semantic structure failing one or more of the set of validation tests.

\* \* \* \* \*